Figure 1:
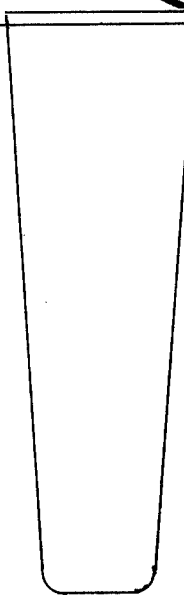

United States Patent [19]

Nowak

[11] 4,204,341
[45] May 27, 1980

[54] TRANSPARENT COMMUNICATION CHART

[76] Inventor: Paul Nowak, 75 Carol St., Ramsey, N.J. 07446

[21] Appl. No.: 958,838

[22] Filed: Jan. 5, 1979

[51] Int. Cl.² ............................................ G09B 21/00
[52] U.S. Cl. ......................................................... 35/1
[58] Field of Search .................... 35/1, 7 R, 62, 66, 26; 40/159, 426, 586

[56] References Cited

U.S. PATENT DOCUMENTS

| | | | |
|---|---|---|---|
| 450,615 | 4/1891 | Delany | 35/1 X |
| 1,415,833 | 5/1922 | Ginsburg | 35/26 |
| 1,716,036 | 6/1929 | Dunning | 35/26 X |
| 1,801,546 | 4/1931 | Enderle | 40/159 |
| 1,962,687 | 6/1934 | Hodge | 35/1 |
| 3,670,435 | 6/1972 | Steward | 40/426 |
| 3,673,711 | 7/1972 | English | 35/62 |
| 3,879,859 | 4/1975 | English | 35/62 X |

Primary Examiner—Harland S. Skogquist

[57] ABSTRACT

A hand held transparent card is imprinted with letters and numbers on a five by eight grid of squares. The numerals, the alphabet, a slash mark and several abbreviated symbols are sequentially imprinted in the center of the said squares.

1 Claim, 1 Drawing Figure

TRANSPARENT COMMUNICATION CHART

The Alpha-Screen is a transparent, hand-held, plastic screen divided into 40, one inch squares containing letters, numbers, and a slash mark, all of which may be viewed from either side, so that a speech-impaired person may spell out messages face to face with another person or persons, by pointing or responding to pointing at the proper sequence of squares, that is, letters or numbers.

The FIGURE shows the front view of the Alpha-Screen. The screen is ⅛" thick plastic. The handle in this instance is ¼" plastic with a soft polyvinyl cover. In this case, the transparent plastic is Plexiglas but may be any cut or molded plastic as long as it is transparent.

The lettering as well as the squares may be applied by any appropriate method such as silk-screen or hot-stamp film transfer. The lettering is done reverse to normal sequence as viewed from the front, since the viewer does not need this aid in locating the letters. The viewer reponds to the finger of the speech handicapped person as he sees it pointed to a sequence of letters from the other side. The slash mark or diagonal line across the two square rectangle directly above the handle is used to indicate the end of a word. A simple wave of the hand may also be used instead of pointing to the slash. This is done to avoid confusion by the running together of words or letters to make incorrect words. The "wh" combination and the "and" sign are used simply for speed.

The screen as viewed by the user has the letters and numbers arranged in the normal reading sequence to facilitate locating each one. This way, seeing the letters as mirror image proves to be very little handicap to identification.

Besides the unique feature of this item which allows the handicapped person to face those he communicates with right through the screen, its light weight and portability make it convenient to use anywhere. Even more importantly, it requires less coordination than writing and no special training which is particularly important in, for example the stroke victim.

The Alpha Screen may easily adapt to specialized uses through the addition of words and extra clip on lines. By placing the handle in a stand, a speech handicapped person also missing the use of his hands may point to the letters with a device held in the mouth.

In the case of those individuals totally paralyzed and unable to point in any manner the Alpha Screen may still be used. In this instance, the screen is held by someone else who then points out row and letters using blinks or tongue clicks to locate the appropriate letter. While somewhat slower than with the handicapped person pointing, this is to my knowledge the first rapid, versatile, and effective low technology method for communicating with such people.

The Alpha Screen may also be used in the class room for spelling games and as an adjunct in the teaching of the deaf. For those such as the deaf who may learn or use speech rehabilitation, the Alpha Screen may be used as an aid for simultaneous communication along with speech.

What is claimed is:

1. A hand held transparent card imprinted with letters and numbers on a grid comprising:
   a transparent plastic rectangular card,
   a handle attached to the said card,
   a five by eight grid of squares imprinted on the card,
   the numerals, the alphabet, a slash mark and several abbreviated symbols being sequentially imprinted in the center of the said squares.

* * * * *